INVENTOR
SAMUEL WINTERS
BY Beale and Jones
ATTORNEYS 3,516,457
HAND HELD MITER GUIDE FOR USE WITH A POWER SAW
Samuel Winters, 1801 Randolph Drive,
Pocahontas, Ark. 72455
Filed May 27, 1969, Ser. No. 828,169
Int. Cl. B27b *27/06*
U.S. Cl. 143—6                                          6 Claims

ABSTRACT OF THE DISCLOSURE

This disclosure relates to a miter guide having a U-shaped base member which is pivotally mounted on a guide plate. The guide plate has two forward guiding edges which intersect to form a right angle with each other and a single rearward guiding edge, all of which are turned up to provide shoulders or flanges for engaging the shoe plate of an electric power saw. The position of the guide plate can be varied with respect to the base member so that different angular cuts can be made on a workpiece. Two apertures in the guide plate are arranged so that a workpiece may be hand held against the base member thereby preventing movement of the workpiece while it is being cut.

BACKGROUND OF THE INVENTION

This invention relates, in general, to guides for saws, and more particularly to a hand held miter guide for an electric power saw.

Although there are many known miter guides for use with electric power saws, they are very cumbersome and difficult to use. Generally, the user must clamp the workpiece to a table or to the miter guide in order to use the present devices, and they cannot be used at the work area because they are usually large and difficult to manage in small areas where a carpenter may be working. The use of power saws has increased a carpenter's output of work greatly; however, when cutting rafters, molding, or the like to predetermined angles, it is necessary that the carpenter first make a preliminary measurement at the work area, then go to another area where a miter device may be set up before he can use the power saw. The necessity of going to another area wastes much valuable time which could be avoided by a lighter and more manageable miter guide which could be easily carried by the carpenter to the area where he is working, and there make the miter cuts.

SUMMARY OF THE INVENTION

It is, therefore, an object of this invention to provide a light-weight, portable, durably constructed and simple to use miter guide which can be used at a worksite and can be easily carried by a workman.

Another object of this invention is to provide a miter guide which is so constructed that it can make three different angular cuts on a workpiece quickly and accurately, without adjustment.

Another object of this invention is to provide a miter guide which can be held by hand rather than using clamps, tables or complex guides and fences to provide quick and accurate miter cuts.

Still another object of this invention is to provide a simple and useful portable miter guide which may be used with almost all of the present kinds of power saws which have a square shoe plate.

These and other objects are accomplished by the present invention through the use of a miter guide which includes a U-shaped base member having a web portion and two sides perpendicular to the web portion for engaging a workpiece to be cut, and a guide plate member which is pivotally secured to the web portion of the base member. The guide member is a plate having two forward guide edges which form a right angle with each other, and a single rearward guide edge. The two forward edges and the rearward edge are turned up to form guide flanges for engaging the shoe plate of an electric power saw in order to provide a means to guide the power saw as a workpiece is cut. The base member is mounted on the guide plate so it is perpendicular to the rearward edge of the guide plate when in the normal position. As the guide plate is pivoted on the base member, the sides of the base member form varying angles with the two forward edges of the guide plate whereby, a workpiece placed along the base member and extending beyond the forward edges may be cut at many varying angles. The guide plate has two cutouts so that the user can hold the workpiece against the side of the base member with one hand, without the necessity of using clamps, while the saw is operated by the other hand.

The miter guide may be made of aluminum or like material so that it will be sufficiently lightweight that it can easily be carried by a carpenter on a belthook. This portability allows the user to carry the miter to the worksite and, if necessary, to make angle cuts on rafters and the like after they have been nailed in place. Since about 95% of the lumber materials used in normal home construction work have dimensions of less than 2 or 2½ inches, the cutouts provided in the miter guide plate permit the user to grip the material and the miter with one hand. However, the guide is not limited to small workpieces, but can be used with any size lumber and held in place by hand. Thus, the user can hold the miter in place and make his cut easily and quickly, without the use of clamps or complex guides. Further, and most important, the cutouts are so located on the guide plate that the user cannot injure his hand with the saw while the cut is being made; the cutouts force the user to keep his hand away from the saw.

In use, the operator sets the desired angle of cut by pivoting the base member, or channel, with respect to the guide plae. He then extends his fingers and thumb through the cutouts to grasp the workpiece to be cut, gripping it to hold it firmly against the base member. By then moving the saw along the flange of one of the guide edges, the workpiece will be cut at the selected angle. It will be noted that the device will accommodate both a "left-handed" and a "right-handed" hand power saw for 45° and 90° cuts. Other angles may be cut by suitable adjustment of the device. Preferably, the pivot point which fastens the base member to the guide plate is offset from the center line of the guide plate to provide more accurate angle adjustments.

BRIEF DESCRIPTION OF THE DRAWINGS

The foregoing and additional objects, features, and advantages of the invention will be apparent to those skilled in the art from the following detailed description of a preferred embodiment thereof, taken with the accompanying drawings in which.

DESCRIPTION OF A PREFERRED EMBODIMENT

Figure 1:
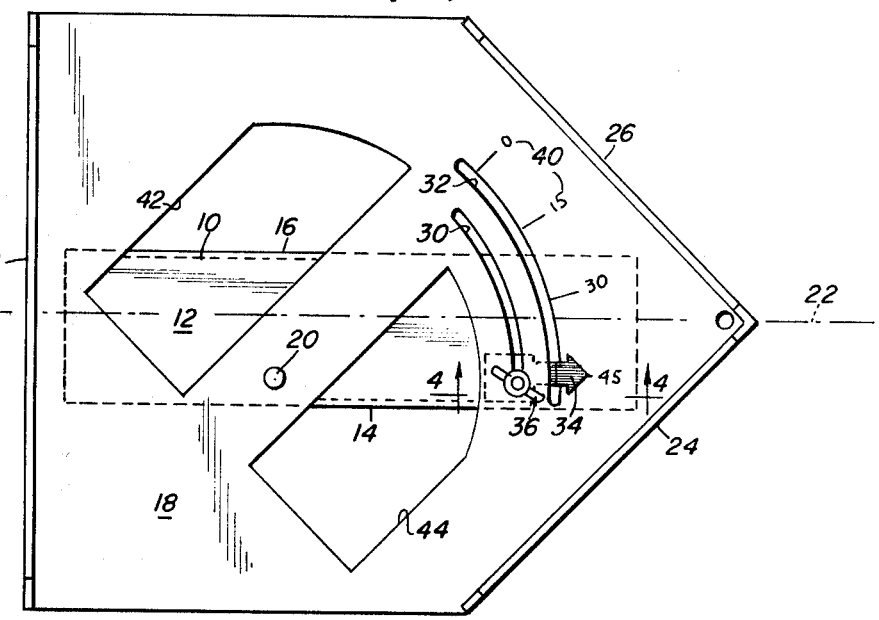
FIG. 1 is top view of the miter guide device according to the invention.
Figure 2:
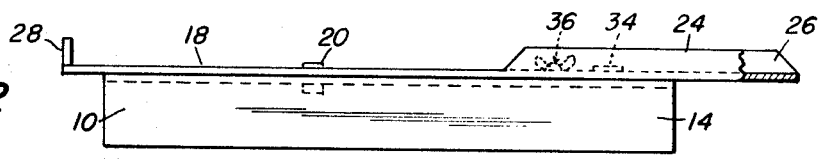
FIG. 2 is a side view of a miter guide according to the invention.

Referring more particularly to the drawings, in FIG. 1 the numeral 10 indicates a U-shaped base member having a web portion 12 and two sides 14 and 16 perpendicular to the web portion 12. A guide plate member 18 is pivotally secured to the web portion 12 of the base member 10 by a fastener 20 such as a rivet. The base member is offset from the center line 22 of the guide member 18, and the fastener 20 is located toward the rearward end of the base member 10, shown in FIG. 1 as being to the left, and is offset from the center line of the guide member 18 near the side 14 of the base member 10. The guide plate 18 has two forward guide edges 24 and 26 as shown to the right of FIG. 1, which form a 90° angle with each other. A single rearward guide edge 28, shown at the left of FIG. 1, is spaced from the forward edges and arranged at a 45° angle with both. The two forward and the rearward edges are upturned in order to provide a flange or guide for engaging a shoe plate of an electric power saw, as may be more clearly seen in FIG. 2.

In the normal position, as shown in FIG. 1, the sides 14 and 16 of the base member 10 are parallel to the center line of the guide plate and thus are perpendicular to the rearward edge and form a 45° angle with the two forward edges 24 and 26 of the guide plate. This arrangement permits the user to make a 90° cut in a workpiece or a left hand or right hand 45° cut, when a workpiece is placed against either side of the base 10 and extends beyond the edges of the guide plate.

Figure 4:
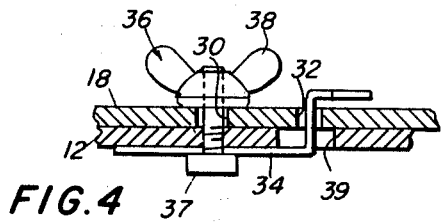
FIG. 4 is a detailed cross-section of the pointer and wing nut assembly taken on line 4—4 of FIG. 1.

First and second arcuate slots 30 and 32, respectively, located near the forward edge of the guide plate, are adapted to receive a pointer 34 and a wing nut assembly 36 affixed to the base member for motion therewith. The bolt 37 of the assembly 36, as shown in FIG. 4, passes through the pointer 34, is threaded into the web portion 12 of the base member, and has an unthreaded shank portion which passes through slot 30 in the guide plate. A final threaded portion of the bolt extends above the guide plate 18 and receives the wing nut 38 of the assembly 36. The pointer 34 is bent at an angle 90° to the web portion 12 of the base 10 so it will extend upwardly through an aperture 39 in web portion 12 and through the second arcuate slot 32 in guide plate 18. The pointer has a second 90° bend so that it will be parallel to the web portion 12 and the surface of guide member 18. Associated with the second slot 32 are calibration numbers 40 which are either painted or etched on the surface of the guide plate 18 to indicate the angle at which the workpiece will be cut as the guide plate 18 is pivoted on the base member 10.

The wing nut is tightened down on bolt 37 to hold the base member and the guide plate in a fixed position; when the wing nut is loosened to allow the bolt and the pointer to slide within the first and second slots in the guide plate, the base member may be pivoted with respect to the guide plate. When the desired position is reached, as indicated by the pointer, the wing nut may be tightened to prevent any movement between the guide plate and the base member as the miter guide is being used.

First and second cutouts 42 and 44, respectively, are provided in the guide plate 18, the cutouts being located in such a way that the user of the miter guide can grasp a workpiece and hold it against the side members of the base member while the miter guide is in use.

Figure 3:
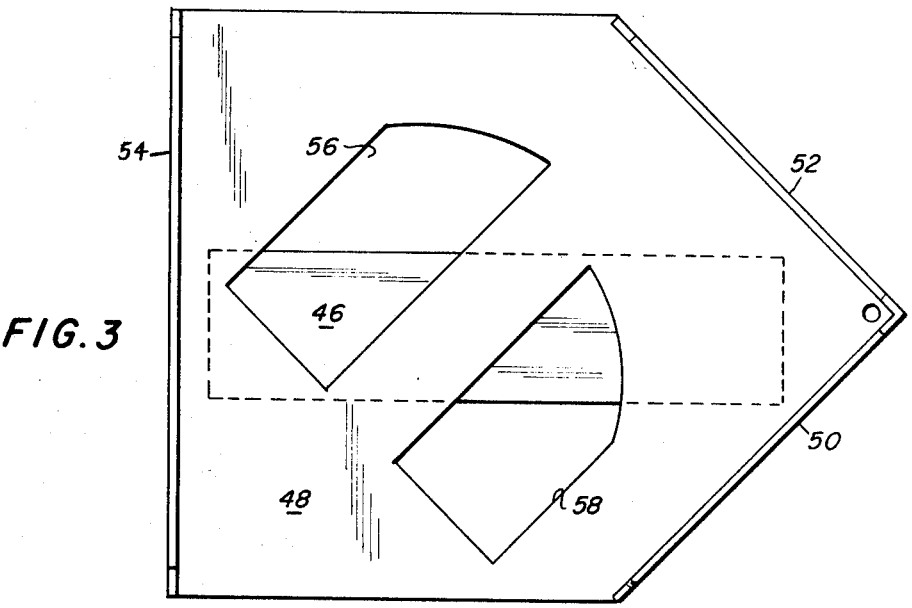
FIG. 3 is a top view of a modified and simpler embodiment of the subject invention.

FIG. 3 shows a simplified embodiment of the miter guide device which is constructed by deleting the adjustablity feature. A base member 46 similar to the one U-shaped base described above carries a guide member 48 which is rigidly secured thereto. The guide member has two forward edges, 50 and 52 respectively, at 90° to each other and a single rearward edge 54 which is spaced from the forward edges and is at a 45° angle to the forward edges. The forward and rearward edges are turned up to form flanges for guiding the shoe of an electric power saw. Two cutouts 46 and 58 arranged similarly to the cutouts as shown in FIG. 1 are in the guide member 48 so that the user of the miter guide may grasp the workpiece and hold it firmly. This embodiment will allow the user to make a left hand or right hand 45° cut or a 90° cut, but does not permit adjustability to other angles. However, such a miter can be used for most carpentary jobs at a building site.

It can be seen from the above description and drawings that the miter guide is a simple and manageable device which can be used by a carpenter in close areas or at a worksite and provides a means to hold the workpiece without the necessity of clamps or the like. It also provides a means to cut a workpiece at varied angles so they may be fitted together more readily.

The above described embodiment can be modified in numerous ways, for example, by varying the position of the pivoting fastener 20 and the slots which receive the pointer and the wing and nut bolt assembly 36, and by varying the angular intersection of the forward edges from 45° to 30° or increasing the calibration from 0 to 45 to 0 to 60; however, these and other variations or changes can be made in the invention without departing from the true spirit and scope thereof as defined in the following claims.

I claim:

1. A miter guide for a portable power saw comprising a guide member of a predetermined shape for engaging a shoe plate of a portable power saw so that a workpiece can be cut at 45° and 90° angles, and a base member carrying said guide member and engaging the workpiece so that the workpiece can be held in alignment for cutting said guide member has two forward edges and a rearward edge, the forward edges at 90° to each other and each forward edge being at a 45° angle with said rear edge, each edge forming a guide for engaging a shoe plate of an electric power saw.

2. The device of claim 1, further including a cutout in said guide member so that the workpiece can be held by hand against the base member.

3. The device of claim 2, further including means for adjusting said guide member with respect to said base member so that the workpiece can be cut at varied angles.

4. The device of claim 3, wherein said base member is U-shaped and includes a web portion and two sides perpendicular to the web portion, said guide member being pivotally secured to the web portion of said base member said sides being adapted to engage a workpiece.

5. The device of claim 4, wherein said guide member is a plate having two forward edges which form a right angle with each other, a single rearward edge, said two forward and rearward edges being turned up to form guide flanges for engaging a shoe plate of an electric power saw.

6. The device of claim 1, wherein the rearward edge is at 90° to the base, said base being U-shaped and having two sides, one side placed so a workpiece can be held against the base with the end extending past one forward edge, the other side placed so a workpiece can extend past the other forward edge.

References Cited

UNITED STATES PATENTS

| | | | |
|---|---|---|---|
| 821,959 | 5/1906 | Oxnam | 143—86 |
| 1,706,115 | 3/1929 | Hannah | 143—6.43 |
| 2,638,134 | 5/1953 | Kearney | 143—86 |
| 2,822,834 | 2/1958 | Hammers | 143—6.43 |
| 3,124,175 | 3/1964 | McCloud | 143—6.43 |

DONALD R. SCHRAN, Primary Examiner

U.S. Cl. X.R.

143—86